(12) United States Patent
Aoki

(10) Patent No.: US 8,754,174 B2
(45) Date of Patent: *Jun. 17, 2014

(54) SOLVENTLESS ADDITION-CURABLE PRESSURE SENSITIVE SILICONE ADHESIVE COMPOSITION AND ADHESIVE ARTICLE

(75) Inventor: Shunji Aoki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 341 days.

This patent is subject to a terminal disclaimer.

(21) Appl. No.: 13/197,962

(22) Filed: Aug. 4, 2011

(65) Prior Publication Data
US 2012/0045635 A1  Feb. 23, 2012

(30) Foreign Application Priority Data

Aug. 23, 2010 (JP) ................................ 2010-186334

(51) Int. Cl.
*C08G 77/08* (2006.01)

(52) U.S. Cl.
USPC ................ 525/478; 528/15; 528/31

(58) Field of Classification Search
USPC ....................... 528/15, 31; 525/478
See application file for complete search history.

(56) References Cited

U.S. PATENT DOCUMENTS

| | | | |
|---|---|---|---|
| 6,387,487 B1 * | 5/2002 | Greenberg et al. | 428/355 R |
| 7,687,591 B2 | 3/2010 | Bhagwagar et al. | |
| 7,728,080 B2 | 6/2010 | Aoki | |
| 8,206,831 B2 * | 6/2012 | Aoki | 428/447 |

FOREIGN PATENT DOCUMENTS

| | | |
|---|---|---|
| JP | 2004-506778 | 3/2004 |
| JP | 2004-231900 | 8/2004 |
| JP | 2006-160923 | 6/2006 |
| JP | 2006-520838 | 9/2006 |
| JP | 2007-126576 | 5/2007 |
| JP | 2008-24777 | 2/2008 |
| JP | 2008-274251 | 11/2008 |

OTHER PUBLICATIONS

Extended Search Report issued Nov. 15, 2011 in European Application No. 11176930.3.

* cited by examiner

*Primary Examiner* — Margaret Moore
(74) *Attorney, Agent, or Firm* — Oblon, Spivak, McClelland, Maier & Neustadt, L.L.P.

(57) ABSTRACT

A solventless addition-curable pressure sensitive silicone adhesive composition is provided. The composition comprises (A) an alkenyl group-containing polydiorganosiloxane; (B) a condensation product of (a) a polydiorganosiloxane having hydroxyl group or an alkoxy group on opposite ends of the molecular chain and (b) a polyorganosiloxane containing $R^1{}_3SiO_{1/2}$ unit and $SiO_2$ unit as critical components and also a $HOSiO_{3/2}$ unit in the molecule; (C1) a polyorganohydrosiloxane having at least three SiH groups per molecule; (C2) a polydiorganohydrosiloxane having SiH group on opposite ends; and (D) a platinum group metal catalyst. Use of the present composition enables production of a pressure sensitive adhesive agent having flexibility, pressure sensitive adhesiveness, and heat resistance, and the present composition is particularly effective for use as a buffer member having pressure sensitive adhesiveness.

17 Claims, No Drawings

SOLVENTLESS ADDITION-CURABLE PRESSURE SENSITIVE SILICONE ADHESIVE COMPOSITION AND ADHESIVE ARTICLE

CROSS-REFERENCE TO RELATED APPLICATION

This non-provisional application claims priority under 35 U.S.C. §119(a) on Patent Application No. 2010-186334 filed in Japan on Aug. 23, 2010, the entire contents of which are hereby incorporated by reference.

TECHNICAL FIELD

This invention relates to a solventless addition-curable pressure sensitive silicone adhesive composition and an adhesive article.

BACKGROUND ART

Pressure sensitive adhesive tapes and labels prepared by using a pressure sensitive silicone adhesive have been used under severe conditions where organic adhesives such as acrylic adhesives and rubber adhesives would be denatured and deteriorated since the layer of the pressure sensitive silicone adhesive has excellent heat resistance, cold resistance, weatherability, electric insulation, and chemical resistance. In addition, pressure sensitive silicone adhesives exhibit good adhesion to various substrates, and therefore, they are used for adhesion onto a substrate such as polyolefin resin, silicone resin, fluororesin, or a water-bearing surface which could not be adhered by organic pressure sensitive adhesives such as acrylic resin or rubber adhesion.

For example, adhesive tapes prepared by using a pressure sensitive silicone adhesive are used in the production, processing, and assembly of electronic and electric components. When heat is applied in such production process, entire or partial protection, re-masking, or temporary fixing of the electronic and electric components is often required. In the case of a pressure sensitive adhesive tape used for such application or the tape used in the production, fixture, or bundling of electronic and electric components exposed to a high temperature condition, preferred is the use of pressure sensitive adhesive tapes prepared by using a pressure sensitive silicone adhesive which retain their heat resistance even after heating to a temperature in excess of 250° C. In such applications, the pressure sensitive silicone adhesive is used as a pressure sensitive silicone adhesive tape prepared by coating a plastic film substrate with such adhesive to a thickness of several dozen μm.

In the recent production of electronic and electric equipment such as mobile phone, a pressure sensitive adhesive tape is quite often used as a means for fixing the parts since such use enables production of a thinner equipment with reduced weight. In such equipment, a shock-absorbing or stress-relaxing buffer member in the form of a sheet having a thickness of 0.1 to several mm is often incorporated for the purpose of preventing damage of the equipment or the interior parts by falling, pressing, or vibration, and such member is often fixed by using a double sided pressure sensitive adhesive tape or sheet. Such case, however, requires additional step of adhering the buffer member by using a pressure sensitive adhesive tape or sheet or additional preliminary multi-step preparation of a laminate comprising a film substrate having the buffer member layer on one surface and a pressure sensitive adhesive layer on the other side, and the assembly and processing often became complicated. Accordingly, there has been a demand for a buffer member having an adhesiveness that would enable the adhesion of member itself to various parts or casing.

Adhesion of members each having a size of several cm or more using a conventional pressure sensitive silicone adhesive was also associated with the problem of difference in the degree of expansion between the members due to the different expansion coefficient. More specifically, expansion and shrinkage of the members by repetitive temperature change resulted in the strain or deformation of the members as well as interfacial peeling between the member and the pressure sensitive adhesive. Conventional pressure sensitive silicone adhesives had been insufficient for use as a pressure sensitive adhesive member having the buffering property capable of absorbing such change.

In addition, conventional pressure sensitive silicone adhesives are mostly solvent type adhesives which suffer from foaming during the thermal curing when coated and cured or molded to a thickness of 0.1 mm or more. Accordingly, use of a solventless pressure sensitive silicone adhesive is preferable for such application.

Another type of materials used for the shock-absorbing and stress-relaxing member are soft gel materials comprising resins such as urethane resin and acrylic resin. However, gel materials generally suffer from insufficient heat resistance, and yellowing occurred even at a temperature as low as 100° C. Accordingly, these materials could not be used for an optical material. These materials also suffered from insufficient flexibility at low temperature as well as insufficient adhesiveness at high temperature. As described above, there has so far been no material fulfilling the requirement as described above.

Exemplary heat resistant gel materials include silicone gels, and silicone gels exhibiting the pressure sensitive adhesion are disclosed, for example, in JP-A 2007-126576. However, these silicone gels are insufficient in the adhesion to the substrate, and they may be peeled when an exterior force is applied. The silicone gels are also insufficient in the coherence, and the gel may undergo cohesive failure in the reworking such re-attaching of the gel, and the gel often remained on the substrate.

Conventional pressure sensitive silicone adhesives can be produced in a sheet-form product with sufficient pressure sensitive adhesiveness by coating on a plastic substrate or the like. Such products, however, were insufficient in the flexibility, and this prevented their use for a buffer member. In addition, when such product was adhered to an article with surface irregularities, the surface of the pressure sensitive adhesive layer could not fully fit the surface irregularities, and the remaining air gaps often prevented the pressure sensitive adhesive layer from fully adhering to the article surface.

A silicone composition for an addition curable pressure sensitive adhesive containing a mixture of a polyorganosiloxane having an alkenyl group and a polyorganosiloxane having no alkenyl group, a polyorganosiloxane having $R_3SiO_{0.5}$ unit and $SiO_2$ unit, and a polyorganosiloxane containing SiH group is disclosed in JP-A 2008-24777. While this composition is described to exhibit strong adhesion to silicone rubbers, this composition which is a solvent-type composition was inferior in the flexibility and had little buffering function.

In addition, an addition curable pressure sensitive silicone adhesive composition containing a component prepared by partial condensation of (A) a raw rubber-like diorganopolysiloxane having hydroxyl group bonded to the silicon atom but no alkenyl group, (B) a raw rubber-like diorganopolysiloxane having an alkenyl group, (C) a polyorganosiloxane comprising $R_3SiO_{1/2}$ unit and $SiO_2$ unit and containing at least 1.8% by weight of hydroxyl group bonded to the silicon atom, and (D) a polyorganosiloxane comprising $R_3SiO_{1/2}$ unit and $SiO_2$ unit containing less than 1.8% by weight of hydroxyl group bonded to the silicon atom; and an organopolysiloxane having hydrogen atom bonded to the silicon atom is disclosed in JP-A 2004-231900. While this composition is said to exhibit a high pressure sensitive adhesion and a low tack, this composition which is a solvent-type composition was also inferior in the flexibility and had little buffering function. Furthermore, this composition had a drawback that, when one side of the sheet was several cm or more and the area was several dozen cm² or more and the adhesion was beyond certain level, the adhered sheet could not be peeled off for reworking that is sometimes required to correct the erroneous positioning.

Another solventless pressure sensitive silicone adhesive disclosed is disclosed in JP-A 2008-274251. This composition comprises an alkenyl group-containing polydiorganosiloxane, a polyorganohydrosiloxane having 3 SiH groups, a polydiorganosiloxane having a low degree of polymerization having an alkenyl group at opposite ends, a polydiorganosiloxane having a low degree of polymerization having a SiH group at opposite ends, a polyorganosiloxane comprising $R_3SiO_{1/2}$ unit and $SiO_2$ unit, and a platinum based catalyst. This composition exhibited high re-peelability and adequate pressure sensitive adhesion, and since the composition is solventless, it could be coated into a thick film. However, the resulting film was insufficient in the flexibility and buffering function.

The solventless pressure sensitive silicone adhesive disclosed in JP-A 2006-160923 was also insufficient in the flexibility and buffering function.

Another solventless or low solvent-type pressure sensitive silicone adhesive is disclosed in JP-A 2004-506778. This low solvent-type pressure sensitive silicone adhesive contains an alkenyl-terminated polydiorganosiloxane, a silanol-terminated polydiorganosiloxane, a resin copolymer containing $R_3SiO_{1/2}$ unit and $SiO_2$ unit, an organohydrogen polysiloxane, a hydrosilylation catalyst, and an organic peroxide or an organic azo compound. This composition exhibits high pressure sensitive adhesion and tack, and the substrate may become deformed or damaged in the reworking or reattachment. The composition also suffered from the problem of foaming when the cured product was used at a high temperature or in the vacuum because of the decomposition residue remaining in the cured product due to the organic peroxide or organic azo compound used for the curing.

Another solventless pressure sensitive silicone adhesive is disclosed in JP-A 2006-520838. This adhesive is a solventless pressure sensitive silicone adhesive which contains an organic siloxane polymer having an aliphatic unsaturated group, a resin having $R_3SiO_{1/2}$ unit and $SiO_2$ unit, a reactive diluter agent, an SiH-containing crosslinking agent, a hydrosilylation catalyst, and an inhibitor. This composition is also insufficient in the flexibility and buffering function. This adhesive also suffered from the problem caused by the use of a reactive diluent such as an alkene having a terminal double bond. More specifically, bubbles often remained in the cured product due to the foaming during the curing of the thick film, and when the diluent remained unreacted in the adhesive, the cured product suffered from foaming in the use of the cured thick film at a high temperature or in the vacuum.

SUMMARY OF THE INVENTION

The present invention has been completed in view of the situation as described above, and an object of the present invention is to provide a solventless addition-curable pressure sensitive silicone adhesive composition which exhibits high flexibility, pressure sensitive adhesion, and heat resistance, and which can be used for a buffer member. Another object of the present invention is to provide a pressure sensitive article prepared by curing the composition as described above.

In order to achieve the objects as described above, the inventors of the present invention made an intensive study, and found that a solventless addition-curable pressure sensitive silicone adhesive composition containing components (A) to (D) as described below can be used for the pressure sensitive silicone adhesive composition, and such solventless addition-curable pressure sensitive silicone adhesive composition simultaneously exhibits excellent flexibility, pressure sensitive adhesion, and heat resistance, and such composition is highly adapted for use as a pressure sensitive adhesive member fulfilling the buffer function.

Accordingly, the present invention provides a solventless addition-curable pressure sensitive silicone adhesive composition and a pressure sensitive article.

[1] A solventless addition-curable pressure sensitive silicone adhesive composition comprising (A) a polydiorganosiloxane having at least two alkenyl group-containing organic groups per molecule represented by the following general formula (1):

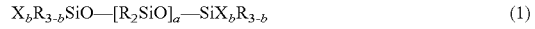
$$X_bR_{3-b}SiO\text{—}[R_2SiO]_a\text{—}SiX_bR_{3-b} \tag{1}$$

wherein X is an alkenyl group-containing organic group containing 2 to 10 carbon atoms, R is independently a monovalent hydrocarbon group containing 1 to 10 carbon atoms, a is an integer of $50 \leq a \leq 2{,}000$, and b is an integer of 1 to 3, (B) a condensation product of the $SiOR^2$ group of the following component (a) with the SiOH group of the component (b):

(a) a polydiorganosiloxane having hydroxyl group or an alkoxy group on opposite ends of the molecular chain represented by the following general formula (2):

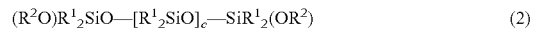
$$(R^2O)R^1{}_2SiO\text{—}[R^1{}_2SiO]_c\text{—}SiR^1{}_2(OR^2) \tag{2}$$

wherein $R^1$ is independently a monovalent hydrocarbon group containing 1 to 10 carbon atoms excluding alkenyl group-containing organic groups, $R^2$ is hydrogen atom or $R^1$, and c is an integer of $50 \leq c \leq 2{,}000$, and (b) a polyorganosiloxane containing $R^1{}_3SiO_{1/2}$ unit (wherein $R^1$ is as defined above), $SiO_2$ unit, and a siloxane unit having hydroxyl group bonded to the silicon atom wherein molar ratio of the $R^1{}_3SiO_{1/2}$ unit to the $SiO_2$ unit is 0.6 to 1.0 and content of the hydroxyl group is at least 0.1% by weight and less than 1.8% by weight, with the proviso that the component (A) is 10 to 90 parts by weight, the component (a) is 5 to 60 parts by weight, and the component (b) is 5 to 60 parts by weight in relation to 100 parts by weight of the total of the components (A), (a), and (b), (C) component (C1) of a polyorganohydrosiloxane having at least three SiH groups per molecule, or the component (C1) and component (C2) of a polydiorganohydrosiloxane having SiH group on opposite ends represented by the following general formula (3):

$$HR^1{}_2SiO\text{—}[R^1{}_2SiO]_d\text{—}SiR^1{}_2H \tag{3}$$

wherein $R^1$ is as defined above and d is an integer of $5 \leq d \leq 500$) (with the proviso that molar ratio of the SiH group in the component (C1) to the alkenyl group in the component (A) is 0.2 to 15, and molar ratio of the SiH group in the component (C2) to the alkenyl group in the component (A) is 0 to 5), and (D) a platinum group metal catalyst (1 to 500 ppm by weight in terms of the platinum group metal in relation to the total of the components (A), (a), and (b)).

[2] A solventless addition-curable pressure sensitive silicone adhesive composition according to the above [1] wherein the molar ratio of the SiH group in the component (C1) to the alkenyl group in the component (A) is in the range of 0.3 to 5, and the molar ratio of the SiH group in the component (C2) to the alkenyl group in the component (A) is in the range of 0.2 to 3.

[3] A solventless addition-curable pressure sensitive silicone adhesive composition according to the above [1] or [2] wherein the composition has a viscosity at 25° C. of 1,000 to 500,000 mPa·s.

[4] A solventless addition-curable pressure sensitive silicone adhesive composition according to any one of the above [1] to [3] wherein the composition has a probe tack of 50 to 500 gf when measured by pressing a prove with a diameter 5 mm having a smooth tip surface against an adhesive sheet prepared by forming a pressure sensitive adhesive layer of the pressure sensitive silicone adhesive composition to a thickness of 0.5 mm on a polyimide film having a thickness of 50 μm at right angle and at a speed of 1 cm/second so that the contact pressure is 20 g/cm², and measuring the force required for detaching the probe after pressing the probe for 1 second.

[5] A solventless addition-curable pressure sensitive silicone adhesive composition according to any one of the above [1] to [4] wherein the composition has an adhesiveness of 0.05 to 4.0 N/25 mm when measured by attaching an adhesive sheet with a width of 25 mm prepared by forming a pressure sensitive adhesive layer of the pressure sensitive silicone adhesive composition to a thickness of 40 μm on a polyimide film having a thickness of 25 μm on a stainless steel plate, and peeling the adhesive tape therefrom in the direction of 180° at a speed of 300 mm/minute.

[6] An adhesive article having buffering properties (excluding those for aerospace) prepared by coating, curing, or molding the solventless addition-curable pressure sensitive silicone adhesive composition of any one of the above [1] to [5] to a thickness of at least 10 μm.

The present invention does not cover the articles used in the aerospace, for example, articles used for adhering or tentatively holding various members used in the space in the artificial satellite or space probe, and articles used to collect samples from the surface of space bodies including small solar system bodies such as asteroid and comet, terrestrial planets such as mercury, and solid satellites such as moon.

The pressure sensitive adhesive articles of the present invention may be used as a pressure sensitive adhesive article for adhering or tentatively holding various members in various cargo planes, air crafts, and buildings in polar regions or high mountains at various temperature conditions from low temperature to high temperature.

The present invention may also be used in various scientific surveys other than the sample collection in the space exploration. Examples of such use include use of the present invention for collecting samples such as rocks, gravel, and organisms from hardly accessible remote locations in high temperature conditions, for example, from locations near the crater of an active volcano, in low temperature conditions, for example, polar regions and high mountains, and in the underwater environment, for example, the bottom of ocean and lakes.

Advantageous Effects of the Invention

The present invention provides a solventless addition-curable pressure sensitive silicone adhesive composition which does not contain any organic solvent. Use of this composition enables production of a pressure sensitive adhesive which exhibits high flexibility, pressure sensitive adhesion, and heat resistance. Such an adhesive is particularly suitable for use as a pressure sensitive adhesive buffer member.

DESCRIPTION OF THE EMBODIMENTS

Next, the present invention is described in detail.
Component (A)

Component (A) is a substantially straight chain polydiorganosiloxane having an alkenyl group-containing organic group at the terminal of the molecular chain represented by the following general formula (1).

$$X_b R_{3-b} SiO\text{---}[R_2 SiO]_a\text{---}SiX_b R_{3-b} \tag{1}$$

X is an alkenyl group-containing organic group containing 2 to 10 carbon atoms, and examples include alkenyl groups such as vinyl group, allyl group, hexenyl group, and octenyl group; acryloylalkyl groups and methacryloylalkyl groups such as acryloylpropyl group, acryloylmethyl group, and methacryloylpropyl group; cycloalkenylalkyl groups such as cyclohexenylethyl group; and alkenyloxyalkyl groups such as vinyloxypropyl group. The most preferred in industrial point of view is vinyl group.

R is independently a monovalent hydrocarbon group containing 1 to 10 carbon atoms, and examples include alkyl groups such as methyl group, ethyl group, propyl group, and butyl group; cycloalkyl groups such as cyclohexyl group; alkenyl groups such as vinyl group, allyl group, hexenyl group, and octenyl group; aryl groups such as phenyl group and tolyl group; and any of such groups having a part or all of hydrogen atoms bonded to the carbon atom in the group substituted with a halogen atom such as fluorine atom or other groups such as trifluoromethyl group and 3,3,3-trifluoropropyl group. The most preferred are methyl group and phenyl group.

Symbol "a" is an integer of $50 \leq a \leq 2{,}000$, and preferably $50 \leq a \leq 1{,}500$.

Symbol "b" is an integer of 1 to 3, and preferably 1.

Preferably, 0.03 to 4% by mole, more preferably 0.03 to 1.5% by mole, and preferably 0.05 to 1% by mole of the all silicon atoms of the component (A) has an alkenyl group. When the content is less than 0.03% by mole, the resulting composition may suffer form insufficient curability while content in excess of 4% by mole may result in the loss of the adhesion and tack of the resulting composition.

The polydiorganosiloxane which is substantially straight chain may contain up to 10 $RSiO_{3/2}$ units and up to 10 $SiO_2$ units per one molecule of the component (A). When the polydiorganosiloxane contains x $RSiO_{3/2}$ units (wherein x is an integer of 1 to 10), the number of the $X_b R_{3-b} SiO_{1/2}$ unit at the terminal is preferably x+2. When the polydiorganosiloxane contains x $SiO_2$ units (wherein x is an integer of 1 to 10), the number of the $X_b R_{3-b} SiO_{1/2}$ unit is preferably 2x+2.

The polydiorganosiloxane is preferably an oily polydiorganosiloxane. When the polydiorganosiloxane is oily, viscosity at 25° C. of the component (A) is preferably at least 60 mPa·s and up to 200,000 mPa·s. The viscosity of less than 60 mPa·s is inadequate since such viscosity may invite loss of the flexibility of the pressure sensitive adhesive layer. The viscosity in excess of 200,000 mPa·s may result in the unduly high viscosity of the composition which may render the coating difficult. The viscosity may be measured by a rotary viscometer (This applies to the following description).

The component (A) may comprise two or more types of compounds, and in this case, 0.03 to 4% by mole of all silicon atoms in the component (A) may contain the alkenyl group.

The component (A) is generally prepared by catalytically polymerizing a monomer such as octamethylcyclotetrasiloxane with a silane compound or a siloxane compound having dimethylvinyl siloxane unit and a silane compound or a siloxane compound having dimethylsiloxane unit or methylvinylsiloxane unit. However, the thus polymerized reaction product contains low molecular weight cyclic siloxanes, and therefore, the low molecular weight cyclic siloxanes are preferably disilled off from the reaction product at elevated temperature and/or under reduced pressure by introducing an inert gas.

In the present invention, the component (A) is a component used for the reaction with the component (C1) to form a crosslinking structure. When the formation of the crosslinking structure is insufficient, the cured composition will experience loss of coherence. Excessively firm crosslinking, on the other hand, results in the insufficient flexibility of the cured composition.

Component (B)

Component (B) is a component used for simultaneously providing the present composition with adhesiveness and flexibility. More specifically, the component (B) is a condensation product formed by condensing the $SiOR^2$ unit of the component (a) with the SiOH group of the component (b) as described below. The component (a) is a substantially straight chain polydiorganosiloxane having hydroxyl group or an alkoxy group at opposite ends of the molecular chain represented by the following general formula (2).

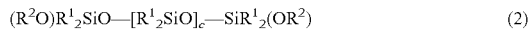

$$(R^2O)R^1_2SiO\text{---}[R^1_2SiO]_c\text{---}SiR^1_2(OR^2) \quad (2)$$

In the formula (2), $R^1$ is independently a monovalent hydrocarbon group containing 1 to 10 carbon atoms excluding alkenyl group-containing organic groups. Exemplary such groups include alkyl groups such as methyl group, ethyl group, propyl group, 2-propyl group, butyl group, and 2-butyl group; cycloalkyl groups such as cyclohexyl group; aryl groups such as phenyl group and tolyl group; as well as an of these groups wherein a part or all of the hydrogen atoms bonded to the carbon atom are substituted with a halogen atom such as fluorine atom or other groups, for example, trifluoromethyl group, or 3,3,3-trifluoropropyl group. The particularly preferred are methyl group and phenyl group.

$R^2$ is hydrogen atom or $R^1$, and preferably hydrogen atom. Symbol "c" is an integer of $50 \leq c \leq 2{,}000$, and most preferably $50 \leq c \leq 1{,}500$.

The polydiorganosiloxane which is substantially straight chain may contain up to 2% by mole of the $RSiO_{3/2}$ unit and the $SiO_2$ unit in relation to all siloxane units in the component (A).

The polydiorganosiloxane is preferably an oily polydiorganosiloxane. When the polydiorganosiloxane is oily, viscosity at 25° C. of the component (a) is preferably at least 100 mPa·s and up to 200,000 mPa·s. The viscosity of less than 100 mPa·s is inadequate since such viscosity may invite loss of the flexibility of the pressure sensitive adhesive layer. The viscosity in excess of 200,000 mPa·s may result in the unduly high viscosity of the composition which may render the coating difficult.

The component (a) may comprise two or more types of compounds.

The component (b) is a polyorganosiloxane containing $R^1_3SiO_{1/2}$ unit (wherein $R^1$ is as defined above), $SiO_2$ unit, and a siloxane unit having hydroxyl group bonded to the silicon atom. Molar ratio of the $R^1_3SiO_{1/2}$ unit to the $SiO_2$ unit is 0.6 to 1.0, and preferably 0.8 to 1.0. When the molar ratio is less than 0.6, the composition may suffer from loss of adhesiveness and flexibility, and the molar ratio in excess of 1.0 may result in the loss of adhesiveness. Content of the hydroxyl group is at least 0.1% by weight and less than 1.8% by weight, and preferably 0.3 to 1.7% by weight. When the hydroxyl group content is 1.8% by weight or higher, the cured product may suffer from insufficient flexibility while the hydroxyl group content of less than 0.1% by weight may result in the insufficient coherence of the cured product as well as insufficient condensation between the component (a) and the component (b) which in turn invites staining of the adhered surface.

The siloxane unit having hydroxyl group bonded to the silicon atom is mainly $(HO)SiO_{3/2}$ unit. Other such units include $(HO)(R^2O)SiO_{2/2}$ unit and $(HO)(R^2O)_2SiO_{1/2}$ unit. $R^2$ is as defined above.

In addition, a part of the $SiO_2$ unit may comprise $R^1OSiO_{3/2}$.

$R^1_2SiO$ unit and $R^1SiO_{3/2}$ unit may also be included in the component (b) at a content of up to 20% by mole of the entire silicon atom and at a content not adversely affecting the merits of the present invention. In addition, two ore more types of compounds may be used for the component (b).

The component (A) is preferably incorporated at 10 to 90 parts by weight, more preferably 10 to 60 parts by weight, and more preferably 15 to 50 parts by weight in relation to 100 parts by weight of the total of the components (A), (a), and (b). Durability will be insufficient when the weight ratio of the component (A) is less than 10 parts by weight while the weight ratio in excess of 90 parts by weight results in the loss of flexibility and adhesiveness. The component (a) is preferably incorporated at 5 to 60 parts by weight, and more preferably 15 to 50 parts by weight. Flexibility will be insufficient when the weight ratio of the component (a) is less than 5 parts by weight while the weight ratio in excess of 60 parts by weight results in the reduced coherence and increased transfer of the silicone to the substrate. The component (b) is preferably incorporated at 5 to 60 parts by weight, and more preferably 5 to 45 parts by weight. Adhesiveness will be insufficient when the weight ratio of the component (b) is less than 5 parts by weight while the weight ratio in excess of 60 parts by weight results in an unduly high adhesiveness, and in turn, in the loss of peelability (reworkability) as well as flexibility. While content of the components (a) and (b) are as described above, component (b) is preferably incorporated at a higher content (in the number of molecules, or in moles) than the component (a). In addition, the composition is preferably free from the component (a) which failed to react. In contrast, inclusion in the composition of the unreacted component (b) has no effects on the coherence of the cured article or staining of the substrate since component (b) does not move in the cured article.

The components (a) and (b) may be preliminarily condensed to prepare the component (B) (the condensation product), and this component (B) may be used for the composition. Alternatively, the components (A), (a), and (b) may be simultaneously subjected to the condensation, and in this case, the condensation product of the components (a) and (b) is included in the composition. If desired, the condensation may be accomplished by dissolving a mixture of the components (a) and (b) in an organic solvent such as toluene, xylene, heptane, or octane, and promoting the reaction in the presence of an alkaline catalyst by refluxing the solution at room temperature. In this case, the reaction product may be neutralized as desired.

Exemplary alkaline catalysts include metal hydroxides such as lithium hydroxide, sodium hydroxide, potassium hydroxide, and calcium hydroxide, carbonate salts such as sodium carbonate and potassium carbonate, hydrogencarbonate salts such as sodium hydrogencarbonate and potassium hydrogencarbonate, metal alkoxides such as sodium methoxide and potassium butoxide, organometals such as butyl lithium, potassium silanolate, and nitrogen compounds such as ammonia gas, ammonia solution, methylamine, trimethylamine, and triethylamine, and the preferred are ammonia gas and ammonia solution. The condensation may be conducted at a temperature of 20 to 150° C., and typically, at room temperature to the reflux temperature of the organic solvent for a non-limiting reaction time of 0.5 to 20 hours, and preferably 1 to 10 hours.

If desired, a neutralizer may be added after the completion of the reaction for neutralization of the alkaline catalyst. Exemplary neutralizers include acidic gases such as hydrogen chloride and carbon dioxide, organic acids such as acetic acid, octyl acid, and citric acid, and mineral acids such as hydrochloric acid, sulfuric acid, and phosphoric acid. When the alkaline catalyst used is ammonia gas or ammonia solution, or a low boiling amine compound, the catalyst may be distilled off by introducing an inert gas such as nitrogen.

In the present invention, the component (B) is a component incorporated for the purpose of simultaneously imparting the composition of the present invention with the adhesiveness and the flexibility while suppressing the staining of the substrate with the composition. Higher content of the component (a) results in the higher flexibility while higher content of the component (b) results in the higher adhesiveness. In the absence of the component (b), the cured composition will be a flexible article with insufficient adhesiveness and cohesiveness, and in the absence of the component (a), the cured composition will be an article suffering from an insufficient flexibility. When components (a) and (b) are not condensed, the component (a) which is a flowable oily polymer will readily bleed out of the cured article to stain the substrate. By the condensation of the component (a) with the component (b), the component (b) having a bulky structure is bonded to opposite ends of the straight chain polymer component (a), and the component (b) is held within the crosslinking network of the cured article due to the steric hindrance, and this prevents bleeding, and hence, penetration and staining of the substrate. In addition, since the condensation product of the component (B) does not contain an alkenyl group, it does not react with the component (A) to enter its crosslinking network. Accordingly, movement of the molecule in the crosslinking network is allowed to certain extent, and this results in the flexibility of the cured article. The component (b) is a compound which has been used as a component for imparting the adhesiveness in the conventional pressure sensitive silicone adhesives.

Component (C)

Component (C) may either comprise component (C1) or a combination of the component (C1) with component (C2) as described below.

Component (C1)

Component (C1) is a crosslinking agent which is a straight chain, branched, or cyclic polyorganohydrosiloxane (or organohydrogenpolysiloxane) having at least three hydrogen atoms bonded to the silicon atom per molecule. Non-limiting examples of the component (C1) are those represented by the following general formula (4):

  (4)

wherein $R^1$ is as defined above, g is 0 or 1, e is an integer of at least 1, f is an integer of at least 0 with the proviso that e+2g is at least 3, preferably 3 to 100, and more preferably 3 to 70, and 1≤e+f≤500. Other examples of the component (C1) are those having a structure containing $R^1SiO_{3/2}$ unit, $HSiO_{3/2}$ unit, and $SiO_2$ unit. The component (C1) may also comprise two or more types of the polyorganohydrosiloxane.

The polyorganohydrosiloxane may preferably have a viscosity at 25° C. of 1 to 1,000 mPa·s, and in particular, 2 to 500 mPa·s. The polyorganohydrosiloxane may also be a mixture of two or more types of polyorganohydrosiloxanes.

The component (C1) is preferably incorporated at amount such that molar ratio of the alkenyl group in the component (A) to the SiH group in the component (C1) (SiH group/alkenyl group) is in the range of 0.2 to 15, more preferably 0.3 to 10, and most preferably 0.3 to 5. The ratio of less than 0.2 may result in the low crosslinking density, and hence, in the reduced curability and retention of the resulting pressure sensitive adhesive composition. On the other hand, the ratio in excess of 15 may result in the loss of the flexibility of the composition.

Component (C2)

Component (C2) is a polydiorganohydrosiloxane (or diorganohydrogenpolysiloxane) having hydrogen atom bonded to the silicon atom at opposite ends. This component (C2) has the effect of extending the chain by alternately reacting with the component (A). The polydiorganohydrosiloxane used may be the one represented by the following general formula (3):

  (3)

wherein $R^1$ is as defined above, and d is an integer of 5≤d≤500.

This polyorganohydrosiloxane may preferably have a viscosity at 25° C. of 2 to 5,000 mPa·s, and in particular, 3 to 100 mPa·s. The polyorganohydrosiloxane may also be a mixture of two or more types of polyorganohydrosiloxanes.

The component (C2) is preferably incorporated at amount such that molar ratio of the SiH group in the component (C2) to the alkenyl group in the component (A) (SiH group/alkenyl group) is in the range of 0 to 5, and more preferably 0.2 to 3. The ratio in excess of 5 may result in the loss of the flexibility of the composition.

The molar ratio of the SiH groups in the components (C2) and (C2) to the alkenyl group in the component (A) (SiH group/alkenyl group) is preferably in the range of 0.2 to 15, and more preferably 0.5 to 8.

Component (D)

Component (D) is a platinum group metal-based addition catalyst. Exemplary such catalysts include chloroplatinic acid, an alcohol solution of the chloroplatinic acid, a reaction product of chloroplatinic acid and an alcohol, a reaction product of chloroplatinic acid and an olefin compound, a reaction product of chloroplatinic acid and a vinyl group-containing siloxane, a platinum-olefin complex, a platinum-vinyl group-containing siloxane complex, and a rhodium complex. The preferred are platinum-based catalysts.

The component (D) is preferably used at 1 to 500 ppm by weight, and more preferably at 2 to 100 ppm in terms of the platinum group metal in relation to the total of the components (A), (a), and (b). When used at less than 1 ppm, curability of the composition, and hence, density and retention of the crosslinking may be insufficient. Use in excess of 500 ppm may result in the loss of the flexibility of the present composition.

Component (E)

If desired, a reaction regulator agent may be incorporated in the composition of the present invention as component (E). The reaction regulator agent is added for the purpose of preventing the start of the addition reaction before the thermal curing so that the coating composition will not be viscous or gelated in the preparation of the pressure sensitive silicone adhesive composition or in the coating of the composition on the substrate. More specifically, the reaction regulator agent coordinates with the addition catalyst platinum group metal to suppress the addition reaction, and in the thermal curing, it will be uncoordinated to allow the expression of the catalytic activity. Any reaction regulator agent that has been used for the addition curable silicone composition may be used, and exemplary reaction regulator agents include 3-methyl-1-butyn-3-ol, 3-methyl-1-pentin-3-ol, 3,5-dimethyl-1-hesyn-3-ol, 1-ethynylcyclohexanol, 3-methyl-3-trimethylsiloxy-1-butyne, 3-methyl-3-trimethylsiloxy-1-pentin, 3,5-dimethyl-3-trimethylsiloxy-1-hexyne, 1-ethynyl-1-trimethylsiloxycyclohexane, bis(2,2-dimethyl-3-butynoxy) dimethylsilane, 1,3,5,7-tetramethyl-1,3,5,7-tetravinylcyclotetrasiloxane, 1,1,3,3-tetramethyl-1,3-divinyldisiloxane, maleic acid ester, and adipic acid ester.

The component (E) is preferably incorporated at 0.005 to 5 parts by weight, and more preferably at 0.005 to 2 parts by weight in relation to 100 parts by weight of the total of the components (A), (a), and (b). When used at less than 0.005 part by weight, the composition may become viscous or gelated. Use at an amount in excess of 5 parts by weight may result in the loss of curability.

When the composition of the present invention is used without solvent, it may be prepared by the following exemplary procedures.

(I) Production of a solventless composition by condensing the components (a) and (b) to produce the condensation product of the component (B), removing the solvent if a solvent is for the condensation, and adding the component (A), the component (C), the component (D), and optionally, the component (E) to thereby obtain a solventless composition.

(II) Production of a solventless composition by condensing the components (a) and (b) in the presence of the component (A), removing the solvent if a solvent is for the condensation, and adding the component (C), the component (D), and optionally, the component (E) to thereby obtain a solventless composition.

In the process as described above, the solvent may be removed by a method commonly used in the art. For example, the solvent may be removed by distillation at a temperature of room temperature to 200° C. and at normal pressure or at a reduced pressure with optional introduction of an inert gas such as nitrogen.

The pressure sensitive silicone adhesive composition of the present invention may also contain various optional components in addition to the components as described above. Exemplary such components include non-reactive polyorganosiloxanes such as polydimethylsiloxane and polydimethyldiphenylsiloxane; antioxidants such as phenol, quinone, amine, phosphorus, phosphite, sulfur, thioether antioxidants; light stabilizers such as hindered amine, triazole, and benzophenone light stabilizers; flame retardants such as phosphoric acid ester, halogen, phosphorus, antimony flame retardants; activators such as cationic, anionic, and nonionic activators; antistatic agents such as silicate, metal oxide, and various ion antistatic agents; colorants such as dye and pigment; and fillers such as silica, alumina, and metal salt fillers.

The thus prepared pressure sensitive silicone adhesive composition of the present invention is preferably the one adjusted to have a viscosity at 25° C. of 1,000 to 500,000 mPa·s, and more preferably 1,000 to 300,000 mPa·s. The viscosity of less than 1,000 mPa·s is inadequate, since such low viscosity may invite flowing of the composition on the substrate resulting in an inconsistent surface, or insufficient adhesiveness. The viscosity in excess of 500,000 mPa·s may invite an unduly high viscosity of the composition, and stirring in the production of the composition as well as casting or coating of the composition may be difficult. When a solvent is used, the viscosity may be adjusted as desired by changing amount of the solvent used. For example, the viscosity in the coating may be adjusted to 500 to 50,000 mPa·s.

The pressure sensitive silicone adhesive composition of the present invention is preferably used without any solvent. However, if desired, it may also be used after diluting with a solvent. Examples of the solvent which can be used for the dilution of the present composition include aromatic hydrocarbon solvents such as toluene and xylene, aliphatic hydrocarbon solvents such as hexane, heptane, octane, isooctane, decane, cyclohexane, methylcyclohexane, and isoparaffin, ketone solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone, ester solvents such as ethyl acetate, acetic acid propyl, isopropyl acetate, butyl acetate, and isobutyl acetate, ether solvents such as diethylether, dipropyl ether, diisopropyl ether, dibutyl ether, 1,2-dimethoxy ethane, and 1,4-dioxane, multifunctional solvents such as 2-methoxyethyl acetate, 2-ethoxy ethyl acetate, propylene glycol monomethyl ether acetate, and 2-butoxyethyl acetate, siloxane solvents such as hexamethyldisiloxane, octamethyltrisiloxane, octamethylcyclotetrasiloxane, decamethyl cyclopentasiloxane, tris(trimethylsiloxy)methylsilane, and tetrakis (trimethylsiloxy) silane, and a mixture thereof.

The thus prepared pressure sensitive silicone adhesive composition may be coated on various substrates and cured under predetermined conditions to obtain a pressure sensitive adhesive layer.

Exemplary substrates include films of plastic materials such as polyester, polytetrafluoroethylene, polyimide, polyphenylene sulfide, polyamide, polycarbonate, polystyrene, polypropylene, polyethylene, and polyvinyl chloride; metal foils such as aluminum foil and copper foil; papers such as Japanese paper, synthetic paper, kraft, and polyethylene laminate; cloths, nonwovens, glass cloths, complex substrates prepared by laminating two or more of the materials as described above followed by impregnation of the laminate.

The substrate may be preliminarily treated, for example, by a primer, corona treatment, etching, plasma treatment, sand blasting to thereby improve adhesion of the substrate and the pressure sensitive adhesive layer. The preferred are the treatment with a primer and corona treatment.

The primer composition which may be used in the primer treatment include a polydiorganosiloxane having a terminal SiOH group, a polysiloxane having SiH group and/or a polysiloxane having an alkoxy group, a condensation-curable silicone primer composition containing a condensation catalyst, a polydiorganosiloxane having an alkenyl group such as vinyl group, a polysiloxane having SiH group, and an addition curable silicone primer composition containing an addition catalyst.

The coating may be conducted by a method known in the art, and exemplary coating methods include those using Comma coater, LIP coater, roll coater, die coater, knife coater, blade coater, rod coater, kiss coater, and gravure coater, screen coating, dip coating, and casting. The composition is coated so that the pressure sensitive adhesive layer after the curing has a thickness of at least 10 μm, preferably 10 μm to 10 mm, and more preferably 20 μm to 5 mm.

Non-limiting exemplary curing conditions include the curing at 80 to 180° C. for 30 seconds to 120 minutes.

The composition of the present invention may be directly coated on the substrate as described above to prepare a pressure sensitive adhesive tape. Alternatively, the composition of the present invention may be coated and cured on a release film or a release paper having a release coating on its surface, and the resulting film or paper having the pressure sensitive adhesive layer may be adhered to the substrate with the side of the adhesive layer contacting the substrate to thereby transfer the pressure sensitive adhesive layer to the substrate and prepare a pressure sensitive adhesive tape. Furthermore, the composition of the present invention may be coated and cured on a release film or a release paper having a release coating on its surface, and another release film or release paper having a release coating on its surface may be adhered to the surface of the pressure sensitive adhesive layer to prepare a substrate-less pressure sensitive adhesive sheet.

The pressure sensitive silicone adhesive composition may be poured or cast in a predetermined container or mold, and after volatilizing the solvent if the composition contains a solvent, cured under the conditions as described above to produce a cured article.

Exemplary such containers and molds include those made from a metal such as stainless steel or aluminum, ceramics, a plastic material such as fluororesin. When air is entrapped in the pouring or casting of the composition in the container or mold, defoaming may be conducted by leaving at room temperature, normal pressure, or under reduced pressure. The container or the mold may be preliminarily treated with a mold release agent for facilitating the release of the cured article. Preferable mold release agents are fluorine mold release agents and fluorosilicone mold release agents.

The probe tack of the pressure sensitive adhesive layer of a pressure sensitive adhesive tape comprising a polyimide film having a thickens of 50 μm and a pressure sensitive adhesive layer with a thickness of 0.5 mm formed by coating and curing the composition of the present invention is preferably 50 to 500 gf, more preferably 60 to 500 gf, and most preferably 70 to 400 gf. The probe tack is the force required for separating the probe after pressing a probe having a flat tip with a diameter 5 mm at right angle against the pressure sensitive adhesive layer at a speed of 1 cm/second and a contact pressure of 20 g/cm$^2$ for a dwell time of 1 second. The probe tack of less than 50 gf may result in the poor efficiently in the attaching of the pressure sensitive adhesive tape or the sheet since additional pressing of the tape or the sheet from the substrate side would be required. The probe tack in excess of 500 gf may invite loss of efficiency in the reworking (peeling and attaching) for more correct positioning. The probe tack level can be controlled mainly by adjusting content of the component (b).

The adhesiveness measured by preparing a pressure sensitive adhesive tape having a width of 25 mm comprising a polyimide film having a thickens of 25 μm and a pressure sensitive adhesive layer formed to a thickness of 40 μm, adhering the tape to a stainless steel plate, and peeling the tape in the direction of 180° at a speed of 300 mm/minute is preferably in the range of 0.05 to 4.0 N/25 mm. When the adhesiveness is less than 0.05 N/25 mm, edge of the pressure sensitive adhesive tape or sheet having the composition of the present invention coated thereon may become dethatched and peeled from the substrate. When the adhesiveness is in excess of 4.0 N/25 mm, peeling of the tape or the sheet for the reworking for more correct positioning may become impossible. The level of the adhesiveness can be controlled mainly by adjusting content of the component (b).

The material of the substrate for which the pressure sensitive adhesive tape, pressure sensitive adhesive sheet, buffer member, and the like produced by using the pressure sensitive silicone adhesive composition of the present invention may be used for the shock-absorbing and stress-relaxing purposes is not particularly limited. Exemplary such materials include various optical film, glass, casing, and display panel used in flat displays such as liquid crystal display, organic EL display, and touch panel, parts which are easily breakable by an external force in the electronic and electric components, and substrates of electronic circuits.

EXAMPLES

Next, the present invention is described in further detail by referring to Examples and Comparative Examples, which by no means limit the scope of the present invention.

In the following Examples and Comparative Examples, Me denotes methyl group and Vi denotes vinyl group.

Viscosity

Viscosity was measured at 25° C. using a BH rotary viscometer.

Adhesiveness

A pressure sensitive adhesive tape was prepared by coating the pressure sensitive silicone adhesive composition on a polyimide film having a thickness of 25 μm and a width of 25 mm with an applicator so that the thickness after the curing was 40 μm. The tape was heated for curing under the conditions of 120° C. and 10 minutes. The resulting tape was adhered on a stainless steel plate, and pressed with a 2 kg roller covered with a rubber layer by reciprocating the roller two times. After leaving about 20 hours at room temperature, the force (N/25 mm) required for peeing the tape from the stainless steel plate at a speed of 300 mm/minute and an angle of 180° was measured by a tensile tester.

Probe Tack

A pressure sensitive adhesive sheet was prepared by coating the pressure sensitive silicone adhesive composition on a polyimide film having a thickness of 50 μm with an applicator so that the thickness after the curing was 500 μm. The sheet was heated for curing under the conditions of 120° C. and 10 minutes. From this sheet, a sheet of about 25×25 mm was cut out and its tack was measured using Polyken Probe Tack Tester manufactured by Testing Machines Inc. by using a ring weight which applies a contact pressure of 20 g/cm$^2$, a probe speed of 1 cm/second, a dwell time of 1 second, and a probe diameter of 5 mm.

Penetration

The pressure sensitive adhesive composition was cast by pouring the composition to full depth of a glass dish having a diameter 30 mm and a depth of 15 mm, and after defoamation, the composition was cured by heating under the conditions of 120° C. and 30 minutes. By using the cured composition, the penetration was evaluated by applying a load of 9.4 g with a ¼ cone according to JIS K2220. In the case of the composition using a solvent, the solution of the pressure sensitive silicone adhesive composition was cast in a mold that had been treated with a mold release treatment to a depth (depth after the curing) of about 1.5 mm, air dried for about 12 hours to volatilize the solvent, and cured by heating under the conditions of 120° C. and 30 minutes to prepare a sheet. 10 sheets were placed one on another, and the measurement was also carried out as described above. Higher penetration corresponds to higher flexibility of the cured product while lower penetration means higher hardness of the cured product.

Amount of Silicone Migration to the Substrate

A pressure sensitive adhesive sheet was prepared by repeating the procedure used in measuring the probe tack. This sheet was adhered to a polyester film having a thickness of 23 μm, and after leaving at 25° C. for 7 days, the tape was peeled off the polyester film. Amount of silicon on the surface of the polyester film was measured by a fluorescence X-ray analyzer and the amount of the silicone migration to the polyester surface was expressed in terms of the amount of polydimethylsiloxane per $m^2$.

Cohesive Failure in the Peeling

A pressure sensitive adhesive sheet was prepared by repeating the procedure used in measuring the probe tack, and this sheet was adhered to a porous aluminum plate. After leaving at 25° C. for 7 days, the tape was peeled off the aluminum plate and the plate surface after the peeling was observed. Cohesive failure was evaluated "Yes" when the adhesive layer underwent cohesive failure leaving some of the adhesive layer on the alumina plate, and "No" when no adhesive layer remained on the aluminum plate.

Example 1

45 parts of the vinyl group-containing polydimethylsiloxane (A-1) (viscosity, 30,000 mPa·s) represented by the following average compositional formula:

$$ViMe_2SiO\text{-}[Me_2SiO]_{740}\text{---}SiMe_2Vi \quad (A\text{-}1),$$

15 parts of the hydroxy group-containing polydimethylsiloxane (a-1) (viscosity, 20,000 mPa·s) represented by the following average compositional formula:

$$(HO)Me_2SiO\text{-}[Me_2SiO]_{610}\text{---}SiMe_2(OH) \quad (a\text{-}1),$$

66.7 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82 and content of hydroxyl group bonding to Si atom is 1.2% by weight, and 6.6 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.18 part of the polyorganohydrosiloxane (C1-1) represented by the following formula:

$$Me_3SiO\text{-}[Me_2SiO]_{28}\text{---}[HMeSiO]_{16}\text{---}SiMe_3 \quad (C1\text{-}1),$$

1.17 parts of the polydiorganohydrosiloxane (C2-1) represented by the following formula:

$$HMe_2SiO\text{-}[Me_2SiO]_{18}\text{---}SiMe_2H \quad (C2\text{-}1),$$

0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 2

37.5 parts of the vinyl group-containing polydimethylsiloxane (A-1), 32.5 parts of the hydroxy group-containing polydimethylsiloxane (a-1), 50 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 13.3 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.16 part of the polyorganohydrosiloxane (C1-1), 1.08 parts of the polydiorganohydrosiloxane (C2-1), 0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 3

60 parts of the vinyl group-containing polydimethylsiloxane (A-1), 30 parts of the hydroxy group-containing polydimethylsiloxane (a-1), 16.7 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 26.7 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.39 part of the polyorganohydrosiloxane (C1-1), 1.56 parts of the polydiorganohydrosiloxane (C2-1), 0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 4

85 parts of the vinyl group-containing polydimethylsiloxane (A-1), 10 parts of the hydroxy group-containing polydimethylsiloxane (a-2) (viscosity, 100,000 mPa·s) represented by the following average compositional formula:

$$(HO)Me_2SiO\text{-}[Me_2SiO]_{1080}\text{---}SiMe_2(OH) \quad (a\text{-}2),$$

8.3 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82 and content of hydroxyl group bonding to Si atom is 1.2% by weight, and 30.0 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.58 part of the polyorganohydrosiloxane (C1-1), 2.22 parts of the polydiorganohydrosiloxane (C2-1), 0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 5

90 parts of the vinyl group-containing polydimethylsiloxane (A-1), 5 parts of the hydroxy group-containing polydimethylsiloxane (a-2), 8.3 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 30.0 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.33 part of the polyorganohydrosiloxane (C1-2) represented by the following formula:

$$Me_3SiO—[HMeSiO]_{40}—SiMe_3 \quad (C1-2),$$

0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 6

30 parts of the vinyl group-containing polydimethylsiloxane (A-1), 40 parts of the hydroxy group-containing polydimethylsiloxane (a-1), 50 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 13.3 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.20 part of the polyorganohydrosiloxane (C1-1), 0.63 parts of the polydiorganohydrosiloxane (C2-1), 0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 7

30 parts of the vinyl group-containing polydimethylsiloxane (A-1), 30 parts of the hydroxy group-containing polydimethylsiloxane (a-1), 66.6 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 6.6 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.37 part of the polyorganohydrosiloxane (C1-1), 0.05 part of 1,3,5,7-tetravinyl-1,3,5,7-tetramethyl cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 8

10 parts of the vinyl group-containing polydimethylsiloxane (A-2) (viscosity, 1,000 mPa·s) represented by the following average compositional formula:

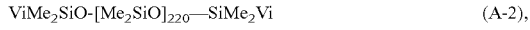

$$ViMe_2SiO-[Me_2SiO]_{220}—SiMe_2Vi \quad (A-2),$$

10 parts of the vinyl group-containing polydimethylsiloxane (A-4) (viscosity, 100 mPa·s) represented by the following average compositional formula:

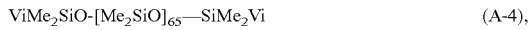

$$ViMe_2SiO-[Me_2SiO]_{65}—SiMe_2Vi \quad (A-4),$$

20 parts of the hydroxy group-containing polydimethylsiloxane (a-2), and 100 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82 were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product,
1.42 part of the polyorganohydrosiloxane (C1-1),
3.77 parts of the polydiorganohydrosiloxane (C2-1),
0.05 part of 1,3,5,7-tetravinyl-1,3,5,7-tetramethyl cyclotetrasiloxane, and
0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 9

40 parts of the vinyl group-containing polydimethylsiloxane (A-2),
50 parts of the hydroxy group-containing polydimethylsiloxane (a-2),
16.7 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and
26.7 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product,
0.52 part of the polyorganohydrosiloxane (C1-1),
3.48 parts of the polydiorganohydrosiloxane (C2-1),
0.05 part of 1,3,5,7-tetravinyl-1,3,5,7-tetramethyl cyclotetrasiloxane, and
0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 10

15 parts of the vinyl group-containing polydimethylsiloxane (A-2),
40 parts of the hydroxy group-containing polydimethylsiloxane (a-2), and
75 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82 were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product,
0.66 part of the polyorganohydrosiloxane (C1-1),
1.30 parts of the polydiorganohydrosiloxane (C2-1),
0.05 part of 1,3,5,7-tetravinyl-1,3,5,7-tetramethyl cyclotetrasiloxane, and
0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Example 11

30 parts of the vinyl group-containing polydimethylsiloxane (A-2),
40 parts of the hydroxy group-containing polydimethylsiloxane (a-2),
50 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and
13.3 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product,
0.39 part of the polyorganohydrosiloxane (C1-1),
2.61 parts of the polydiorganohydrosiloxane (C2-1),
0.05 part of 1,3,5,7-tetravinyl-1,3,5,7-tetramethyl cyclotetrasiloxane, and
0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 1.

Comparative Example 1

40 parts of a raw rubber-like vinyl group-containing polydimethylsiloxane (A-3) having a vinyl group content in the entire siloxane unit of 0.075% by mole, represented by the following average compositional formula:

$$ViMe_2SiO\text{-}[MeViSiO]_{1.5}\text{-}[Me_2SiO]_{4500}\text{---}SiMe_2Vi \qquad (A\text{-}3),$$

20 parts of the hydroxy group-containing polydimethylsiloxane (a-2),
66.7 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82 and content of hydroxyl group bonding to Si atom is 1.2% by weight, and
40 parts of toluene were mixed, and 0.5 part of aqueous ammonia was added. After stirring at 25 to 30° C. for 12 hours, a mixture of aqueous ammonia and toluene was removed by distillation at 100 to 110° C., and toluene was then added so that siloxane concentration was 40% by weight. (The product obtained by removing toluene from this product at 120° C. at reduced pressure was a solid which was non-flowable at 25° C.)

To 250 parts of this reaction product, 0.15 part of the polyorganohydrosiloxane (C1-2) represented by the following formula:

Me$_3$SiO—[HMeSiO]$_{40}$—SiMe$_3$ (C1-2), 0.16 part of ethynylcyclohexanol, and 0.5 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

Comparative Example 2

100 parts of the vinyl group-containing polydimethylsiloxane (A-2), 0.05 part of the polyorganohydrosiloxane (C1-1), 6.5 parts of polyorganohydrosiloxane (C2-1), 3.5 parts of the polyorganohydrosiloxane (C3-1) represented by the following formula:

Me$_3$SiO-[Me$_2$SiO]$_{27}$—[HMeSiO]$_2$—SiMe$_3$ (C3-1), 0.01 part of 1,3,5,7-vinyl-1,3,5,7-cyclotetrasiloxane, 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

Comparative Example 3

25 parts of the vinyl group-containing polydimethylsiloxane (A-3), 25 parts of a raw rubber-like hydroxyl group-containing polydimethylsiloxane (a-3) represented by the following average compositional formula:

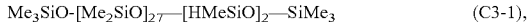

(HO)Me$_2$SiO-[Me$_2$SiO]$_{4400}$—SiMe$_2$(OH) (a-3), 83.3 parts of a toluene solution (60% by weight) of polyorganosiloxane (b-2) containing Me$_3$SiO$_{1/2}$ unit and SiO$_2$ unit wherein molar ratio of the Me$_3$SiO$_{1/2}$ unit to the SiO$_2$ unit is 0.74, and content of the hydroxyl group bonded to the Si atom is 1.4% by weight, and 33.4 parts of toluene were mixed, and 0.5 part of aqueous ammonia was added. After stirring at 25 to 30° C. for 12 hours, a mixture of aqueous ammonia and toluene was removed by distillation at 100 to 110° C., and toluene was then added so that siloxane concentration was 40% by weight. (The product obtained by removing toluene from this product at 120° C. at reduced pressure was a solid which was non-flowable at 25° C.)

To 250 parts of this reaction product, 0.24 part of the polyorganohydrosiloxane (C1-2), 0.16 part of ethynylcyclohexanol, and 0.5 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

Comparative Example 4

7.2 parts of the raw rubber-like vinyl group-containing polydimethylsiloxane (A-5) represented by the following average compositional formula:

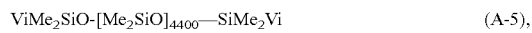

ViMe$_2$SiO-[Me$_2$SiO]$_{4400}$—SiMe$_2$Vi (A-5), 23.7 parts of the hydroxy group-containing polydimethylsiloxane (a-3), 104.2 parts of a toluene solution (60% by weight) of polyorganosiloxane (b-3) containing Me$_3$SiO$_{1/2}$ unit and SiO$_2$ unit wherein molar ratio of the Me$_3$SiO$_{1/2}$ unit to the SiO$_2$ unit is 0.8, and content of the hydroxyl group bonded to the Si atom is 2.1% by weight, 7.7 parts of a toluene solution (60% by weight) of polyorganosiloxane (b-4) containing Me$_3$SiO$_{1/2}$ unit and SiO$_2$ unit wherein molar ratio of the Me$_3$SiO$_{1/2}$ unit to the SiO$_2$ unit is 0.82, and content of the hydroxyl group bonded to the Si atom is 0.5% by weight, and 20.5 parts of toluene were mixed, and 0.5 part of aqueous ammonia was added. After stirring at 25 to 30° C. for 12 hours, a mixture of aqueous ammonia and toluene was removed by distillation at 100 to 110° C., and toluene was then added so that siloxane concentration was 40% by weight. (The product obtained by removing toluene from this product at 120° C. at reduced pressure was a solid which was non-flowable at 25° C.)

To 250 parts of this reaction product, 0.2 part of the polyorganohydrosiloxane (C1-2), 0.16 part of ethynylcyclohexanol, and 0.5 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

Comparative Example 5

45 parts of the vinyl group-containing polydimethylsiloxane (A-1), 15 parts of the hydroxy group-containing polydimethylsiloxane (a-1), 66.7 parts of a toluene solution (60% by weight) of polyorganosiloxane (b-3) containing Me$_3$SiO$_{1/2}$ unit and SiO$_2$ unit wherein molar ratio of the Me$_3$SiO$_{1/2}$ unit to the SiO$_2$ unit is 0.82, and content of the hydroxyl group bonded to the Si atom is 2.2% by weight, and 6.5 parts of toluene were mixed, and 0.5 part of aqueous ammonia was added. After stirring at 25 to 30° C. for 12 hours, a mixture of aqueous ammonia and toluene was removed by distillation at 100 to 130° C., and toluene was removed at 120° C. at a reduced pressure.

To 100 parts of this reaction product, 0.18 part of the polyorganohydrosiloxane (C1-1), 1.17 part of polydiorganohydrosiloxane (C2-1), 0.05 part of 1,3,5,7-tetravinyl-1,3,5,7-tetramethyl-cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

Comparative Example 6

37.5 parts of the vinyl group-containing polydimethylsiloxane (A-1), 32.5 parts of the hydroxy group-containing polydimethylsiloxane (a-1), 50 parts of a toluene solution (60% by weight) of polyorganosiloxane (b-1) containing $Me_3SiO_{1/2}$ unit and $SiO_2$ unit wherein molar ratio of the $Me_3SiO_{1/2}$ unit to the $SiO_2$ unit is 0.82, and 13.3 parts of toluene were mixed, and after removing toluene by distillation at 100 to 130° C., toluene was further removed at 120° C. at a reduced pressure. Accordingly, condensation between component (a-1) and component (b-1) was not substantially conducted.

To 100 parts of this reaction product, 0.16 part of the polyorganohydrosiloxane (C1-1), 1.08 part of polydiorganohydrosiloxane (C2-1), 0.05 part of 1,3,5,7-tetravinyl-1,3,5,7-tetramethyl-cyclotetrasiloxane, and 0.1 part of a silicone solution of a platinum-vinyl group-containing siloxane complex containing 0.5% by weight of platinum were added, and the mixture was stirred to prepare a pressure sensitive silicone adhesive composition. This pressure sensitive silicone adhesive composition was evaluated for its viscosity, adhesion, probe tack, penetration, silicone migration, and occurrence of cohesive failure in the peeling. The results are shown in Table 2.

TABLE 1

| Component (part by weight) | | Example | | | | | |
|---|---|---|---|---|---|---|---|
| | | 1 | 2 | 3 | 4 | 5 | 6 |
| (A) | (A-1) | 45 | 37.5 | 60 | 85 | 90 | 30 |
| | (A-2) | | | | | | |
| | (A-3) | | | | | | |
| | (A-4) | | | | | | |
| | (A-5) | | | | | | |
| (a) | (a-1) | 15 | 32.5 | 30 | | | 40 |
| | (a-2) | | | | 10 | 5 | |
| | (a-3) | | | | | | |
| (b) | (b-1) | 40 | 30 | 10 | 5 | 5 | 30 |
| | (b-2) | | | | | | |
| | (b-3) | | | | | | |
| | (b-4) | | | | | | |
| (C1) | (C1-1) | 0.18 | 0.16 | 0.39 | 0.58 | | 0.20 |
| | (C1-2) | | | | | 0.33 | |
| (C2) | (C2-1) | 1.17 | 1.08 | 1.56 | 2.22 | | 0.63 |
| (C3) | (C3-1) | | | | | | |
| Items measured | | | | | | | |
| Viscosity (mPa · s) | | 87,000 | 95,000 | 29,000 | 47,500 | 44,000 | 304,000 |
| BH viscometer | | | | | | | |
| Rotor No. | | 7 | 7 | 6 | 6 | 6 | 7 |
| Number of rotation (rpm) | | 20 | 20 | 20 | 10 | 10 | 10 |
| Adhesiveness (N/25 mm) | | 0.79 | 0.36 | 0.20 | 0.18 | 0.15 | 0.48 |
| Probe tack (gf/5 mm diam.) | | 234 | 178 | 113 | 65 | 58 | 173 |
| Penetration | | 21 | 40 | 19 | 17 | 16 | 32 |
| Silicone migration (g/m²) | | 0.009 | 0.026 | 0.019 | 0.003 | 0.002 | 0.016 |
| Cohesive failure in the peeling | | No | No | No | No | No | No |

| Component (part by weight) | | Example | | | | |
|---|---|---|---|---|---|---|
| | | 7 | 8 | 9 | 10 | 11 |
| (A) | (A-1) | 30 | | | | |
| | (A-2) | | 10 | 40 | 15 | 30 |
| | (A-3) | | | | | |
| | (A-4) | | 10 | | | |
| | (A-5) | | | | | |
| (a) | (a-1) | 30 | | | | |
| | (a-2) | | 20 | 50 | 40 | 40 |
| | (a-3) | | | | | |

TABLE 1-continued

| | | | | | | |
|---|---|---|---|---|---|---|
| (b) | (b-1) | 40 | 60 | 10 | 45 | 30 |
| | (b-2) | | | | | |
| | (b-3) | | | | | |
| | (b-4) | | | | | |
| (C1) | (C1-1) | 0.37 | 1.42 | 0.52 | 0.66 | 0.39 |
| | (C1-2) | | | | | |
| (C2) | (C2-1) | | 3.77 | 3.48 | 1.30 | 2.61 |
| (C3) | (C3-1) | | | | | |

Items measured

| | | | | | |
|---|---|---|---|---|---|
| Viscosity (mPa · s) | 220,000 | 468,000 | 24,000 | 25,000 | 263,000 |

BH viscometer

| | | | | | |
|---|---|---|---|---|---|
| Rotor No. | 7 | 7 | 6 | 6 | 7 |
| Number of rotation (rpm) | 10 | 4 | 20 | 20 | 10 |
| Adhesiveness (N/25 mm) | 0.90 | 1.6 | 0.26 | 2.7 | 0.55 |
| Probe tack (gf/5 mm diam.) | 235 | 325 | 84 | 270 | 199 |
| Penetration | 40 | 26 | 18 | 48 | 34 |
| Silicone migration (g/m$^2$) | 0.020 | 0.021 | 0.029 | 0.011 | 0.006 |
| Cohesive failure in the peeling | No | No | No | No | No |

TABLE 2

| Component | | Comparative Example | | | | | |
|---|---|---|---|---|---|---|---|
| (part by weight) | | 1 | 2 | 3 | 4 | 5 | 6 |
| (A) | (A-1) | | | | | 45 | 37.5 |
| | (A-2) | | 100 | | | | |
| | (A-3) | 40 | | 25 | | | |
| | (A-4) | | | | | | |
| | (A-5) | | | | 7.2 | | |
| (a) | (a-1) | | | | | 15 | 32.5 |
| | (a-2) | 20 | | | | | |
| | (a-3) | | | 25 | 23.7 | | |
| (b) | (b-1) | 40 | | | | | 30 |
| | (b-2) | | | 50 | | | |
| | (b-3) | | | | 62.5 | 40 | |
| | (b-4) | | | | 4.6 | | |
| (C1) | (C1-1) | | 0.05 | | | 0.18 | 0.16 |
| | (C1-2) | 0.15 | | 0.24 | 0.2 | | |
| (C2) | (C2-1) | | 6.5 | | | 1.17 | 1.08 |
| (C3) | (C3-1) | | 3.5 | | | | |

Items measured

| | | | | | | |
|---|---|---|---|---|---|---|
| Viscosity (mPa · s) | *1 | 940 | *1 | *1 | 110,000 | 78,000 |

BH viscometer

| | | | | | | |
|---|---|---|---|---|---|---|
| Rotor No. | *1 | 3 *2 | *1 | *1 | 7 | 7 |
| Number of rotation (rpm) | | 60 | | | 20 | 20 |
| Adhesiveness (N/25 mm) | 1.8 | 0.03 | 5.3 | 5.6 | 0.49 | 0.22 |
| Probe tack (gf/5 mm diam.) | 238 | 74 | 420 | 18 | 40 | 250 |
| Penetration | 25 | 70 | 10 | 11 | 15 | 38 |
| Silicone migration (g/m$^2$) | 0.004 | 0.008 | 0.011 | 0.0198 | 0.011 | 0.259 |
| Cohesive failure in the peeling | No | Yes | No | Yes | No | Yes |

*1 When the solvent was removed, the composition became a non-flowable solid, and the coating and the curing could not be effected without using a solvent.
*2 A BM rotary viscometer was used.

Japanese Patent Application No. 2010-186334 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A solventless addition-curable pressure sensitive silicone adhesive composition, consisting of:

(A) a polydiorganosiloxane having at least two alkenyl group-containing organic groups per molecule represented by formula (1):

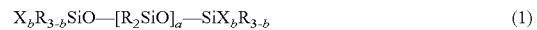

$$X_bR_{3-b}SiO—[R_2SiO]_a—SiX_bR_{3-b} \quad (1)$$

wherein X is an alkenyl group-containing organic group containing 2 to 10 carbon atoms, R is independently a monovalent hydrocarbon group containing 1 to 10 carbon atoms, a is an integer of $50 \leq a \leq 2,000$, and b is an integer of 1 to 3, (B) a condensation product of the SiOR$^2$ group of the following component (a) with the SiOH group of the following component (b):
(a) a polydiorganosiloxane having hydroxyl group or an alkoxy group on opposite ends of the molecular chain represented by formula (2):

$$(R^2O)R^1{}_2SiO—[R^1{}_2SiO]_c—SiR^1{}_2(OR^2) \qquad (2)$$

wherein R$^1$ is independently a monovalent hydrocarbon group containing 1 to 10 carbon atoms excluding alkenyl group-containing organic groups, R$^2$ is hydrogen atom or R$^1$, and c is an integer of 50≤c≤2,000, and
(b) a polyorganosiloxane containing R$^1{}_3$SiO$_{1/2}$ unit (wherein R$^1$ is as defined above), SiO$_2$ unit, and a siloxane unit having hydroxyl group bonded to the silicon atom wherein molar ratio of the R$^1{}_3$SiO$_{1/2}$ unit to the SiO$_2$ unit is 0.6 to 1.0 and content of the hydroxyl group is at least 0.1% by weight and less than 1.8% by weight,
with the proviso that the component (A) is 10 to 90 parts by weight, the component (a) is 5 to 60 parts by weight, and the component (b) is 5 to 60 parts by weight in relation to 100 parts by weight of the total of the components (A), (a), and (b),
(C) component (C1) of a polyorganohydrosiloxane having at least three SiH groups per molecule, or
the component (C1) and component (C2) of a polydiorganohydrosiloxane having SiH group on opposite ends represented by formula (3):

$$HR^1{}_2SiO—[R^1{}_2SiO]_d—SiR^1{}_2H \qquad (3)$$

wherein R$^1$ is as defined above and d is an integer of 5≤d≤500
(with the proviso that molar ratio of the SiH group in the component (C1) to the alkenyl group in the component (A) is 0.2 to 15, and molar ratio of the SiH group in the component (C2) to the alkenyl group in the component (A) is 0 to 5),
(D) a platinum group metal catalyst (1 to 500 ppm by weight in terms of the platinum group metal in relation to the total of the components (A), (a), and (b)), and
(E) a reaction regulator agent at 0.005 to 5 parts by weight in relation to 100 parts by weight of the total of components (A), (a), and (b).

2. A solventless addition-curable pressure sensitive silicone adhesive composition according to claim 1 wherein the molar ratio of the SiH group in the component (C1) to the alkenyl group in the component (A) is in the range of 0.3 to 5, and the molar ratio of the SiH group in the component (C2) to the alkenyl group in the component (A) is in the range of 0.2 to 3.

3. A solventless addition-curable pressure sensitive silicone adhesive composition according to claim 1 wherein the composition has a viscosity at 25° C. of 1,000 to 500,000 mPa·s.

4. A solventless addition-curable pressure sensitive silicone adhesive composition according to claim 1 wherein the composition has a probe tack of 50 to 500 gf when measured by pressing a probe with a diameter of 5 mm having a smooth tip surface against an adhesive sheet prepared by forming a pressure sensitive adhesive layer of the pressure sensitive silicone adhesive composition to a thickness of 0.5 mm on a polyimide film having a thickness of 50 μm at right angle and at a speed of 1 cm/second so that the contact pressure is 20 g/cm$^2$, and measuring the force required for detaching the probe after pressing the probe for 1 second.

5. A solventless addition-curable pressure sensitive silicone adhesive composition according to claim 1 wherein the composition has an adhesiveness of 0.05 to 4.0 N/25 mm when measured by attaching an adhesive sheet with a width of 25 mm prepared by forming a pressure sensitive adhesive layer of the pressure sensitive silicone adhesive composition to a thickness of 40 μm on a polyimide film having a thickness of 25 μm on a stainless steel plate, and peeling the adhesive tape therefrom in the direction of 180° at a speed of 300 mm/minute.

6. An adhesive article having buffering properties (excluding those for aerospace) prepared by coating, curing, or molding the solventless addition-curable pressure sensitive silicone adhesive composition of claim 1 to a thickness of at least 10 μm.

7. A solventless addition-curable pressure sensitive silicone adhesive composition, consisting of:
(A) a polydiorganosiloxane having at least two alkenyl group-containing organic groups per molecule represented by formula (1):

$$X_bR_{3-b}SiO—[R_2SiO]_a—SiX_bR_{3-b} \qquad (1)$$

wherein X is an alkenyl group-containing organic group containing 2 to 10 carbon atoms, R is independently a monovalent hydrocarbon group containing 1 to 10 carbon atoms, a is an integer of 50≤a ≤2,000, and b is an integer of 1 to 3,
(B) a condensation product of the SiOR$^2$ group of the following component (a) with the SiOH group of the following component (b):
(a) a polydiorganosiloxane having hydroxyl group or an alkoxy group on opposite ends of the molecular chain represented by formula (2):

$$(R^2O)R^1{}_2SiO—[R^1{}_2SiO]_c—SiR^1{}_2(OR^2) \qquad (2)$$

wherein R$^1$ is independently a monovalent hydrocarbon group containing 1 to 10 carbon atoms excluding alkenyl group-containing organic groups, R$^2$ is hydrogen atom or R$^1$, and c is an integer of 50≤c≤2,000, and
(b) a polyorganosiloxane containing R$^1{}_3$SiO$_{1/2}$ unit (wherein R$^1$ is as defined above), SiO$_2$ unit, and a siloxane unit having hydroxyl group bonded to the silicon atom wherein molar ratio of the R$^1{}_3$SiO$_{1/2}$ unit to the SiO$_2$ unit is 0.6 to 1.0 and content of the hydroxyl group is at least 0.1% by weight and less than 1.8% by weight,
with the proviso that the component (A) is 10 to 90 parts by weight, the component (a) is 5 to 60 parts by weight, and the component (b) is 5 to 60 parts by weight in relation to 100 parts by weight of the total of the components (A), (a), and (b),
(C) component (C1) of a polyorganohydrosiloxane having at least three Si groups per molecule, or
the component (C1) and component (C2) of a polydiorganohydrosiloxane having SiH group on opposite ends represented by formula (3):

$$HR^1{}_2SiO—[R^1{}_2SiO]_d—SiR^1{}_2H \qquad (3)$$

wherein R$^1$ is as defined above and d is an integer of 5≤d≤500
(with the proviso that molar ratio of the SiH group in the component (C1) to the alkenyl group in the component (A) is 0.2 to 15, and molar ratio of the SiH group in the component (C2) to the alkenyl group in the component (A) is 0 to 5),
(D) a platinum group metal catalyst (1 to 500 ppm by weight in terms of the platinum group metal in relation to the total of the components (A), (a), and (b)), (E) a reaction regulator agent at 0.005 to 5 parts by weight in relation to 100 parts by weight of the total of components (A), (a), and (b), and at least one component selected from the group consisting of a non-reactive polyorganosiloxane, an antioxidant, a light stabilizer, a flame retardant, an activator, an antistatic agent, a colorant, and a filler.

8. A solventless addition-curable pressure sensitive silicone adhesive composition according to claim 7, wherein the molar ratio of the SiH group in the component (C1) to the alkenyl group in the component (A) is in the range of 0.3 to 5, and the molar ratio of the SiH group in the component (C2) to the alkenyl group in the component (A) is in the range of 0.2 to 3.

9. A solventless addition-curable pressure sensitive silicone adhesive composition according to claim 7, wherein the composition has a viscosity at 25° C. of 1,000 to 500,000 mPa·s.

10. A solventless addition-curable pressure sensitive silicone adhesive composition according to claim 7, wherein the composition has a probe tack of 50 to 500 gf when measured by pressing a probe with a of diameter 5 mm having a smooth tip surface against an adhesive sheet prepared by forming a pressure sensitive adhesive layer of the pressure sensitive silicone adhesive composition to a thickness of 0.5 mm on a polyimide film having a thickness of 50 μm at right angle and at a speed of 1 cm/second so that the contact pressure is 20 g/cm², and measuring the force required for detaching the probe after pressing the probe for 1 second.

11. A solventless addition-curable pressure sensitive silicone adhesive composition according to claim 7, wherein the composition has an adhesiveness of 0.05 to 4.0 N/25 mm when measured by attaching an adhesive sheet with a width of 25 mm prepared by forming a pressure sensitive adhesive layer of the pressure sensitive silicone adhesive composition to a thickness of 40 μm on a polyimide film having a thickness of 25 μm on a stainless steel plate, and peeling the adhesive tape therefrom in the direction of 180° at a speed of 300 mm/minute.

12. An adhesive article having buffering properties (excluding those for aerospace) prepared by coating, curing, or molding the solventless addition-curable pressure sensitive silicone adhesive composition of claim 7, to a thickness of at least 10 μm.

13. A solventless addition-curable pressure sensitive silicone adhesive composition, comprising:

(A) a polydiorganosiloxane having at least two alkenyl group-containing organic groups per molecule represented by formula (1);

$$X_bR_{3-b}SiO—[R_2SiO]_a—SiX_bR_{3-b} \quad (1)$$

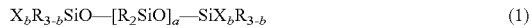

wherein X is an alkenyl group-containing organic group containing 2 to 10 carbon atoms, R is independently a monovalent hydrocarbon group containing 1 to 10 carbon atoms, a is an integer of $50 \leq a \leq 2,000$, and b is an integer of 1 to 3, (B) a condensation product of the SiOR² group of the following component (a) with the SiOH group of the following component (b):

(a) a polydiorganosiloxane having hydroxyl group or an alkoxy group on opposite ends of the molecular chain represented by the following general formula (2):

$$(R^2O)R^1_2SiO—[R^1_2SiO]_c—SiR^1_2(OR^2) \quad (2)$$

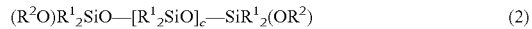

wherein R¹ is independently a monovalent hydrocarbon group containing 1 to 10 carbon atoms excluding alkenyl group-containing organic groups, R² is hydrogen atom or R¹, and c is an integer of $50 \leq c \leq 2,000$, and (b) a polyorganosiloxane containing $R^1_3SiO_{1/2}$ unit (wherein R¹ is as defined above), $SiO_2$ unit, and a siloxane unit having hydroxyl group bonded to the silicon atom wherein molar ratio of the $R^1_3SiO_{1/2}$ unit to the $SiO_2$ unit is 0.6 to 1.0 and content of the hydroxyl group is at least 0.1% by weight and less than 1.8% by weight, with the proviso that the component (A) is 10 to 90 parts by weight, the component (a) is 5 to 60 parts by weight, and the component (b) is 5 to 60 parts by weight in relation to 100 parts by weight of the total of the components (A), (a), and (b), (C) component (C1) of a polyorganohydrosiloxane having at least three SiH groups per molecule, or the component (C1) and component (C2) of a polydiorganohydrosiloxane having SiH group on opposite ends represented by formula (3):

$$HR^1_2SiO—[R^1_2SiO]_d—SiR^1_2H \quad (3)$$

wherein R¹ is as defined above and d is an integer of $5 \leq d \leq 500$ (with the proviso that molar ratio of the SiH group in the component (C1) to the alkenyl group in the component (A) is 0.2 to 15, and molar ratio of the SiH group in the component (C2) to the alkenyl group in the component (A) is 0 to 5), and (D) a platinum group metal catalyst (1 to 500 ppm by weight in terms of the platinum group metal in relation to the total of the components (A), (a), and (b)), wherein said composition has an adhesiveness of 0.05 to 4.0 N/25 mm when measured by attaching an adhesive sheet with a width of 25 mm prepared by forming a pressure sensitive adhesive layer of the pressure sensitive silicone adhesive composition to a thickness of 40 μm on a polyimide film having a thickness of 25 μm on a stainless steel plate, and peeling the adhesive tape therefrom in the direction of 180° at a speed of 300 mm/minute.

14. A solventless addition-curable pressure sensitive silicone adhesive composition according to claim 13, wherein the molar ratio of the SiH group in the component (C1) to the alkenyl group in the component (A) is in the range of 0.3 to 5, and the molar ratio of the SiH group in the component (C2) to the alkenyl group in the component (A) is in the range of 0.2 to 3.

15. A solventless addition-curable pressure sensitive silicone adhesive composition according to claim 13, wherein the composition has a viscosity at 25° C. of 1,000 to 500,000 mPa·s.

16. A solventless addition-curable pressure sensitive silicone adhesive composition according to claim 13, wherein the composition has a probe tack of 50 to 500 gf when measured by pressing a probe with a of diameter 5 mm having a smooth tip surface against an adhesive sheet prepared by forming a pressure sensitive adhesive layer of the pressure sensitive silicone adhesive composition to a thickness of 0.5 mm on a polyimide film having a thickness of 50 μm at right angle and at a speed of 1 cm/second so that the contact pressure is 20 g/cm², and measuring the force required for detaching the probe after pressing the probe for 1 second.

17. An adhesive article having buffering properties (excluding those for aerospace) prepared by coating, curing, or molding the solventless addition-curable pressure sensitive silicone adhesive composition of claim 13, to a thickness of at least 10 μm.

* * * * *